July 5, 1966  J. S. KAWABATA  3,259,155

AUTOMATIC BAND SAW AND METHOD

Filed July 24, 1963  4 Sheets-Sheet 1

Inventor
James S. Kawabata
By Mann, Brown & McWilliams
Attorneys

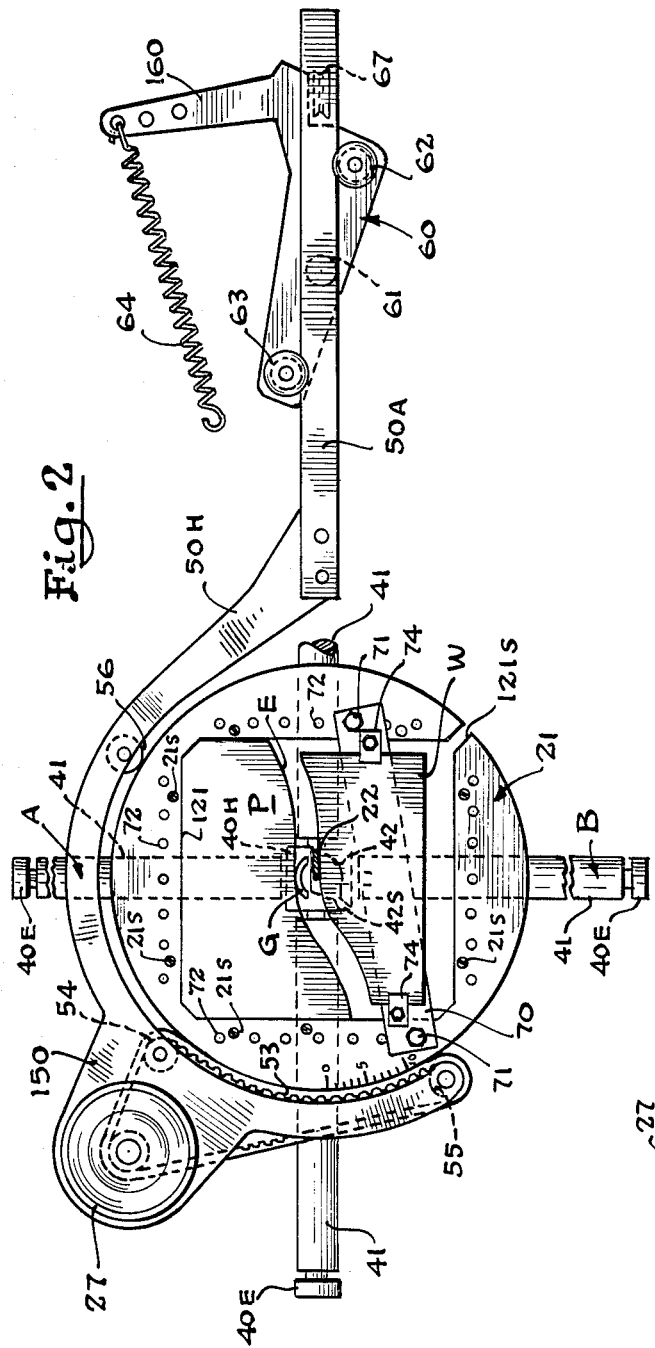

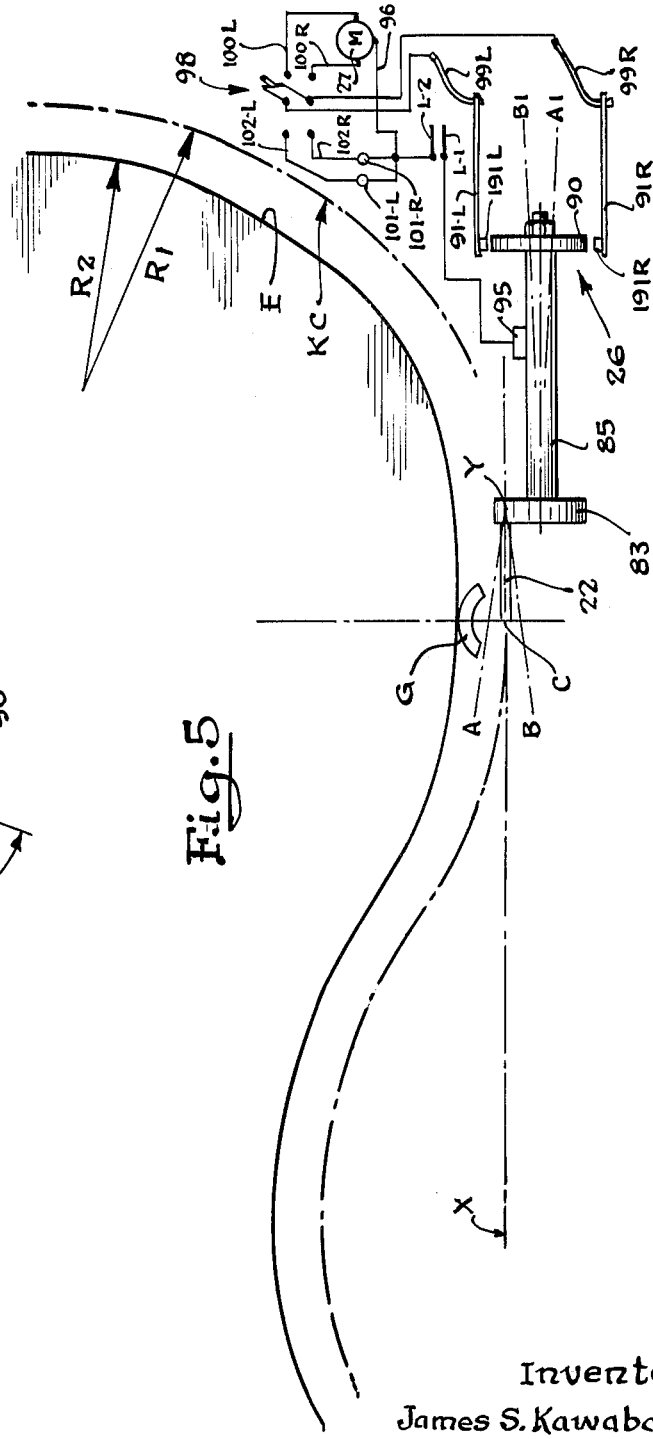

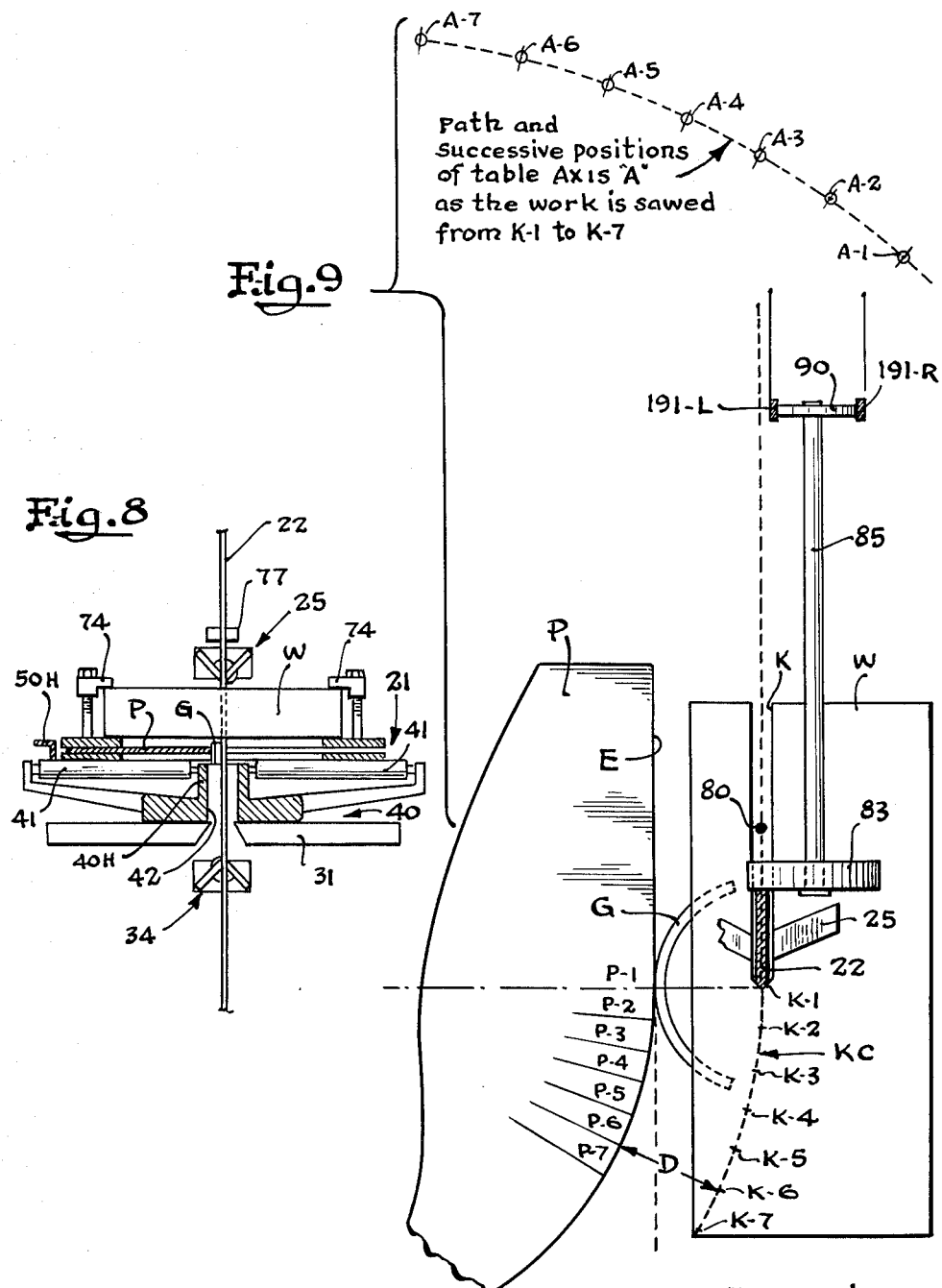

United States Patent Office 3,259,155
Patented July 5, 1966

3,259,155
AUTOMATIC BAND SAW AND METHOD
James S. Kawabata, Chicago, Ill., assignor to Continental Machines, Inc., Savage, Minn., a corporation of Minnesota
Filed July 24, 1963, Ser. No. 297,251
16 Claims. (Cl. 143—26)

This invention relates to band saws and particularly to such band saws wherein the sawing path through the work is automatically controlled.

Band saws have long been recognized as an advantageous and economical means for cutting wood, metal and other materials, and while the primary usefulness of band saws has generally been considered to be in contour cutting, it is found that industrial type band saws are used predominately for making straight line cuts with but little use being made of the contour cutting capabilities of such machines. Such uses in contour sawing are, of course, basically limited to those situations where the curves to be cut are not unduly sharp, but a further and more troublesome factor is found in the inherent roughness and inaccuracy of the surfaces produced by conventional band sawing techniques. The net result of this has been that where smoothness of finish and accuracy of line of cut are important, resort is usually had to other types of saws for straight line cutting and in contour cutting, to tracer or template controlled milling machines which are available although relatively costly. Flame cutting also is used for contour work, and although cuts are produced rapidly and economically with automatically controlled equipment of this type, the required smoothness of surface and accuracy of the line of cut cannot be attained.

It has long been known and recognized that band saws offered a potential means for fast and economical automatic cutting along both straight or contoured patterns or templates, and in view of these recognized possibilities, many efforts have been made to attain acceptable standards of surface smoothness and accuracy of cutting path so that such possibilities might be realized. While such efforts have produced varying degrees of automatic and semi-automatic control both as to straight and contour sawing, they have not resulted in satisfactory smoothness and accuracy of cut, and most certainly such efforts have not improved to any appreciable degree the commercial acceptability of automatic band saws for high quality work.

In view of the foregoing it is the primary object of the present invention to enable band saws to be used under automatic control to cut work pieces along contoured or straight paths with a greatly improved surface finish and accuracy of cut so that the field of usefulness of band saw equipment may be greatly extended.

In band saw operation it is of course essential in the region where the moving band enters the work that backing be provided for the band to absorb the work feed force, and this is accomplished conventionally by back up means such as a roller or rotatable disk, and in addition, conventional band saw techniques provide for saw guides engaging the sides of the saw blade near the upper and lower faces of the work to apply lateral restraint to the saw blade. Such guides are intended to accurately limit and determine the plane of the saw as to both lateral and angular position, and the relative feed path of the saw and the work has then been determined upon the assumption that the saw blade will cut accurately in the plane that has been established by the saw guides. Although such absolute lateral constraint or guiding of the saw blade would appear in theory to provide the basic solution for the problem of attaining both smoothness and accuracy of cut, commercial experience has demonstrated that this theory is unsound.

As applied to automatic contour sawing, which is considered to present the most difficult problems, it has long been the practice to provide a shiftable table carrying the work, and by combined advancing and rotative movement of the table, endeavor to feed the work into the saw with the desired line of cut in the plane of the saw. The rotative movements of the table have been controlled in some instances by a pair of inter-related cams or guides carried on in fixed positions on the table and cooperating with fixed rollers or followers on the machine frame, as in Watkins Patent No. 106,006, patented August 2, 1870; Wrigley Patent No. 273,000, patented February 27, 1883; Benge Patent No. 2,548,698, patented April 10, 1951; Davis Patent No. 2,678,070, patented May 11, 1954; and Davis Patent No. 2,754,858, patented July 17, 1956, or by separately formed pairs of control cams or patterns mounted on the machine frame and acting to govern the rotative position of the table as the operation progresses, as in Francis Patent No. 2,736,349, patented February 28, 1956.

Another and more recent effort to obtain surface smoothness and cut accuracy in automatic band sawing is found in Lindholm Patents 2,914,100 and 2,914,102, patented November 24, 1959. The Lindholm apparatus attempts to attain such smoothness and accuracy in sawing along a straight line, and makes no effort to solve the more difficult problem of attaining such results in contour sawing. Thus in the Lindholm apparatus, which has been marketed by one of the larger companies in the band saw field, the work is fed along a straight path on a conventional reciprocating work table, and in response to constant sensing of the lateral position of the toothed edge of the blade, the usual upper and lower saw guides are automatically adjusted to twist the blades and vary the approach angle thereof with relation to the fixed path of the advancing work.

In practice, neither the rotatable table machines nor the corrective blade twisting structures above described have achieved any appreciable success in attaining surface smoothness or accuracy of the line of cut, and upon analysis I have discovered this failure to be due to the falacious assumption that the location and the cutting path of the saw may be determined and controlled by positive lateral restraint of the saw blade. Such positive lateral restraint of the saw blade has constituted the major similarity between the two general types of automatic band saws above mentioned, and in varying degrees has prevented attainment of both smoothness and accuracy in the work produced thereby.

Upon the basis of the foregoing discovery, analysis of band saw operation has shown that the rapidly moving saw band is subjected to a wide variety of rapidly changing and varying forces. Such forces may be due, for example, to irregularities in tooth spacing, tooth sharpness, tooth set and the relationship of the tooth sharpness and set on opposite sides of the blade, variations in hardness or other characteristics of the work, different twisting tendencies in different portions of a single saw band, and variations in the tension in the saw band as whole and in the region where the band moves through the working or sawing region of the machine. It has been further found that the selection of different tooth spacings, different tooth forms, different types of set, different blade widths and thickness, and different blade speeds as required to handle different materials, contours and work thicknesses, and the necessity of replacing the blades from time to time, all serve to complicate and vary the nature and relationship of the several forces that act on the saw blade and which tend under conventional practice to produce roughness, irregularity, and off-line cuts. Imperfect welds also constitute a disturbing factor that in some instances produce a repetitive lateral excursion of the blade in the sawing zone. Certain of these forces act on the blade when it is running freely without contact with the work, while other of these forces become effective on the blade during the sawing operation.

Having the foregoing considerations in mind it is a further object of this invention to enable a composite of the variable forces acting on a band saw blade when it is running freely to initially establish of its own accord a normal lateral position for the blade as it enters the sawing zone, and to enable this normal lateral position of the saw blade to be thereafter maintained within close limits by manipulating the advancing work piece to relieve any work induced forces that tend to produce lateral displacement of the blade.

Further important objects related to the foregoing are to enable high quality band sawing to be accomplished without undue lateral restraint on the band as it enters the sawing zone, to enable the lateral forces acting between the saw and the work to serve as the basic control for revising the approach direction of the work toward the saw, to enable this to be accomplished in such a way as to be applicable with equal facility to either contour or straight line sawing, to enable this controlling action to be accomplished through the use of a single control pattern or template for a particular contour, and to assure accuracy of the line of cut as well as unusual smoothness of the surface produced.

Other and further objects of the present invention will be apparent from the following description and claims, and are illustrated in the accompanying drawings, which, by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

FIG. 2 is a fragmentary plan view of the machine of FIG. 1;

FIG. 3 is a fragmentary side elevational view of the structure shown in FIG. 2;

FIG. 5 is a schematic plan view showing the relationship of the control means to the saw, the pattern and the work;

FIGS. 6 and 7 are schematic views illustrating different relationships of the circuit control means;

FIG. 8 is a fragmentary vertical sectional view showing the saw as it passes through the table structure; and FIG. 9 is a schematic view illustrating the table movements included.

Figures 1, 4:
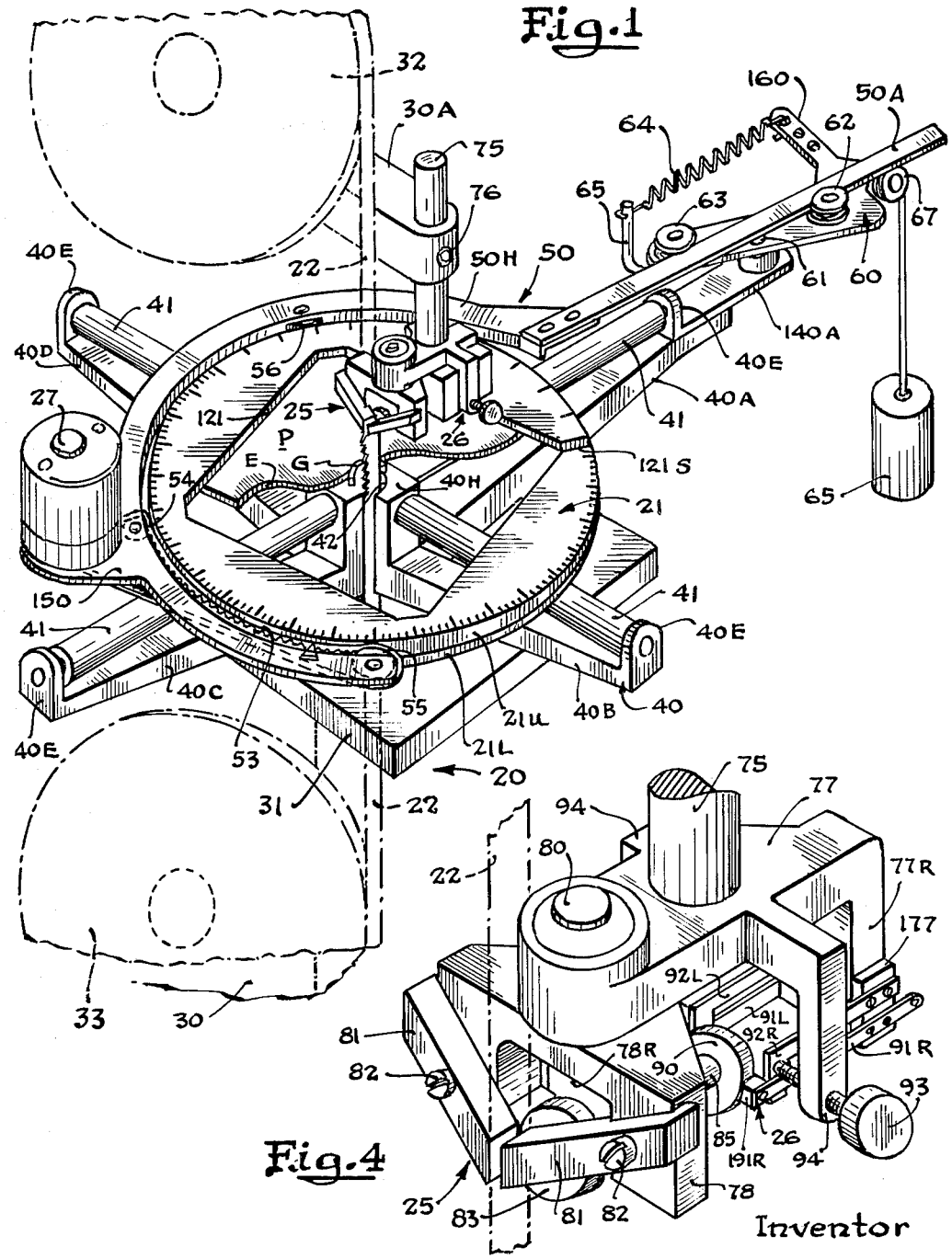
FIG. 1 is a fragmentary front perspective view of an automatic band saw embodying the features of the invention.
FIG. 4 is a fragmentary side perspective view of the sensing and control means of the machine.

For purposes of disclosure the invention is herein illustrated as embodied in a band saw 20 in which a rotatable table 21, adapted to carry a pattern P and a workpiece W that is to be cut along a line KC parallel to the control edge E of the pattern, is yieldingly urged in a feeding direction in the general plane of the saw band 22, and in a lateral direction to maintain the pattern P in engagement with a stationary guide G, the saw band 22 being in effect free-floating and unrestrained or unguided in a lateral sense as it moves downwardly toward and through the workpiece W, and immediately above the workpiece W, the saw band 22 passes through a sensing structure 25 which may be shifted by the saw band 22 toward or away from the guide G and which when thus shifted by forces acting between the work and the saw, is effective through associated control means 26 and power operated means such as a reversible drive motor 27 to cause corrective rotative adjustment of the table 21 so that the sawing operation will proceed along the desired path KC, FIGS. 5 and 8.

The corrective rotative adjustment of the table 21 is accomplished in the same manner, whether the detected lateral shifting of the saw 22 with respect to the guide G results from an undesired right or left hand lead of the saw band itself, or from curvature or change of direction in the controlling edge E of the pattern P, and hence the apparatus of the present invention functions with equal facility in sawing along paths that are either straight or curved, as will become apparent from the following specific description.

As illustrated herein the band saw 20 of the present invention includes the usual frame 30 and stationary table 31 with upper and lower guide wheels 32 and 33 about which the saw band 22 is passed so that one vertical run of the band extends through the table 31. The lower wheel 33 constitutes the drive which advances the saw band 22 downwardly through the table 31, and the saw band 22 may be guided below the table 31 by a saw guide 34 the form and position of the guide being described hereinafter as it relates to the present invention. Where the basic band saw assembly is intended to be used on occasion in the conventional manner, the table 21, its supporting and actuating means including the motor 27, the sensing head 25 and the control means 26 are provided, as in the present instance, as attachments applied to a conventional band saw.

Thus, in this attachment form, the rotatable table 21 is carried on a sub-frame 40 that is removably secured in a fixed position on the machine table 31, and the table 21 is so related to the sub-frame 40 that the table 21 may rotate about its central axis and may move parallel as well as transversely with respect to the plane of the saw band 22. In enabling such complex movements of the table 21 to be accomplished, roller means are provided so that the rotative adjustments of the table 21 may be accomplished with the minimum of power. Thus, in the present instance the sub-frame 40 is cruciform in plan so as to provide four equally spaced horizontal arms 40A to 40D projecting from an upstanding central head 40H and having upstanding ears 40E at their ends so that a roller 41 may be supported over each arm 40A to 40D between the central head 40H and the related ear 40E. The several rollers 41 have their upper surfaces disposed in a common horizontal plane that is just slightly above the top surface of the central head 40H, and thus the lower face of the table 21 may rest on the several rollers 41 for relatively free movement as required. The central head 40H of the sub-frame 40 has a relatively large central vertical passage 42 therein through which the saw band 22 extends, and the sub-frame 40 is located on the machine table 31 so that the axes of the several rollers 41 intersect at the center line of the toothed edge of the saw 22, and the arms 40A and 40C are disposed in the general plane of the saw band. The guide G is carried on and projects upwardly from the top of the head 40H at the side of the passage 42 that is adjacent the arm 40D of the subframe 40, and as will be evident in FIGS. 2 and 5 the guide G is in the form of an arc having an extent of about 90° and centered on a vertical axis that represents the desired or assumed location of the center of the toothed edge of the saw blade 22.

The rotatable table 21 has the required movements imparted thereto by means including an actuating frame 50 that has an arcuate hook shaped portion 50H that embraces a substantial portion of the circular outer edge of the table 21, and which also has an operating and guiding arm 50A that functions in association with the portion 50H in imparting coordinate movements to the table 21 as required. The hook shaped portion 50H is of an angle cross section, as will be evident in FIGS. 1 and 3, so that at the lower edge of the vertical flange may roll or slide on the underlying rollers 41, while the horizontal flange thereof projects outwardly and has an outward extension 150 which serves as a platform on which the motor 27 is mounted.

The actuating frame 50 functions, as will be described, to apply yielding force to the table 21 laterally of the saw blade 22 so as to maintain the controlling edge E of the template or pattern P in engagement with the stationary guide G, and to apply yielding force to the table 21 toward the toothed edge of the saw blade 22 to produce the desired work feed. The hook shaped portion 50H encompasses slightly more than 180° of the circumference of the table 21 so as to extend about the left side and the near side of the table as viewed in FIG. 1. A toothed belt 53 driven by the motor 27 extends about guide pulleys 54 and 55 mounted on the aforesaid near side of the hook shaped portion 50H so that the run of the belt 53 intermediate the pulleys 54 and 55 engages the edge of the table 21. A roller 56 on the left hand part of the hook 50H also engages the edge of the table 21 so that the desired coordinate forces may be applied to the table 21; and when the motor 27 is operated the belt 53 acts frictionally on the edge of the table 21 to rotate the table.

The giuding arm 50A of the actuating frame 50 is formed as a long straight bar and fixed at one end to one end of the hook shaped portion 50H so as to project in a radial relation with respect to the hook shaped portion 50H. The arm 50A extends generally parallel to the plane of the saw band 22 and across a rocker or carrier 60 that is pivoted on a vertical pivot 61 on an extension 140A of the arm 40A. The rocker 60 has grooved rollers 62 and 63 mounted on vertical axes on opposite sides of the axis 61, and the opposite edges of the arm 50A ride in the grooves of the rollers 62 and 63. A spring 64 acting between an arm 160 on the rocker 60 and a fixed anchor 65 on the arm 40A, acts yieldingly to pivot the frame 50 about the axis 61 in a counterclockwise direction as viewed in FIGS. 1 and 2. The yielding force thus applied by the spring 64 holds the pattern P in engagement with the guide G.

The yielding force for imparting feeding movement to the actuating frame 50 and the table 21 is in this instance provided by a weight 65, there being a cord 66 anchored on a stud 66S at one end to the adjacent end of the hook 50H and extended lengthwise beneath the arm 50A and about and downwardly from a pulley 67 carried on the rocker 60 and attached at its lower end to the weight 65.

The table 21, as shown in FIGS. 1 to 3, is frame-like in plan form so as to provide a circular outer edge and a relatively large generally square central opening 121 which provides the area within which pattern P and the work piece W are located and within which the sawing operation takes place. The opening 121 has a slot 121S extended from one of its corners through to the outer edge of the table 21 through which the saw blade 22 may move when the table 21 is to be removed for any purpose. A similar slot 42S is provided in the head 40H between the arms 40B and 40C, for the same general purpose.

The table 21 is made up of a lower relatively thin plate 21L and an upper, thicker plate 21U, and edge portions of the pattern P are clamped between these plates 21L and 21U by means such as a plurality of clamping screws 21S. The template or pattern P is thus located but a short distance above the lower face of the table 21, and in this location the control edge E of the pattern is in position to engage the guide G.

The workpiece W may be supported in different ways on the table 21 according to size and other considerations, and as shown in FIGS. 2 and 3, a support bar 70 is extended at a favorable angle across the opening 121, and is secured in position by cap screws 71 extended through the bar 70 and into certain of a plurality of threaded openings 72 that are provided in the plate 21U for this purpose. Clamps 74 carried by the bar 70 engage the edges of the work piece W to fix the same in position on the support bar 70. In FIG. 8 the clamps 74 are shown as being carried directly on the table 21.

The sensing means 25 and the control means 26 are carried on the lower end of a mounting rod 75, the upper portion of which extends through a rigid supporting arm 30a of the machine frame, and the rod 75 may be set in any desired vertical position by means such as a cap screw 76.

At the lower end of the rod 75 a relatively heavy mounting head 77 is provided, and the sensing means 25 are movably mounted on what amounts to the forward end of the mounting head 77. The sensing means 25 assume a form that is similar to the usual blade or saw guide that is employed in band saws, and the sensing means may thus resemble most any of the conventionally used saw guides. In the present instance the sensing means 26 comprise a relatively heavy block 78 that is located below the forward end of the mounting head 77 and centrally pivoted on the mounting head 77 by a vertical pivot shaft 80.

On the front face of the block 78, downwardly extended saw-engaging arms 81 are provided and are removably held in place by means such as cap screws 82. The arms 81 are arranged to engage opposite side faces of the saw band 22 just rearwardly of the teeth of the saw blade, and this engagement is relatively snug and yet allows the blade 22 to receive the high speed between the opposed end faces of the fingers 81.

It is to be emphasized that while the sensing means 25 resembles the usual upper saw guide, and to a limited extent serve as a guiding function in maintaining the rear edge of the saw in the proper relation to a back-up means, as will be described, the mounting of the sensing means 25 on the vertical pivot 80 causes the sensing means to be responsive to the lateral position that is assumed by the saw blade at this point, and except for the fact that the blade 22 must move out of its normal plane in shifting the sensing means 25 about its pivot 80, no appreciable lateral restraint is applied to the saw blade by the sensing means. The forward face of the block 78 is recessed as at 78R, and within this recess a back-up roller 83 is supported on a rotatable shaft 85 that is journalled in a horizontal position in the block 78. This relationship is such that the smooth rear edge of the saw blade bears against the face of the roller 83 near one edge thereof as will be evident at FIGS. 4 and 5 of the drawings, and it may be noted that in its general form and relationship, the back-up roller 83 is conventional in character. Bearing in mind that considerable lateral freedom of the saw blade in the sawing zone is desired under the present invention, the lower guide 34 is mounted some distance below the level at which the work is to be located, and if desired the lower guide may also be swivel mounted in the general manner described with respect to the sensing means 25.

In the operation of the band saw, the rapid downward movement of the saw blade 22 with its rear edge in engagement with the back-up roller 83 results in rapid rotation of the back-up roller 83. This rotative movement of the roller 83 is utilized in the present instance in the operation of the control means 26, as will be described hereinafter.

The control means 26 are mounted beneath the mounting head 77 and in essence, such control means constitute an electrical circuit control means for the adjusting motor 27, the electrical control means being in turn governed by the position of the sensing means 25. Thus the shaft 85 that is mounted in the block 78 is moved back and forth in accordaace with the location or positioning of the sensing means 25, or in other words the shaft 85 pivots with the block 78 and the sensing means about the vertical axis 80 of the sensing means. The shaft 85 carries an eccentric 90 on its rear end as will be evident in FIGS. 4 and 5, and this eccentric is adapted for cooperation with a pair of switch contact members 91R and 91L that are mounted on the mounting head 77 so as to be disposed on opposite sides of the eccentric 90. Thus the mounting head 77 has a downwardly projecting arm 77R at its rear end and insulating blocks 177 on the opposite sides of the arm 77R serve as a mount for the respective switch members 91L and 91R. These switch members are in the form of resilient switch blades that project into position on opposite sides of the eccentric 90 and have contact elements in the form of carbon brushes 191L and 191R fixed thereon for engagement with the opposite sides of the eccentric 90. The switches 91R and 91L are resilient in character and tend to maintain the carbon brushes in contact with the eccentric 90, it being noted that the eccentric is made from highly conductive material and forms a common element of electrical circuit that may be extended through either or both of the switch members 91L or 91R when the carbon brushes thereof are in engagement with the eccentric disc 90. The extent of the inward movement of the contact members 91R and 91L is adjustably limited by L-shaped stop resilient members 92R and 92L that have a greater spring force than the contact members 91R and 91L. The stop members 92R and 92L are adjusted inwardly to the desired extent by screw threaded members 93 that extend horizontally through depending arms 94 that are provided on opposite sides of the mounting head 77.

Circuit means are shown schematically in FIG. 5 for initially coordinating the control means with a particular saw blade and for then placing the control means 26 in its operative governing relation to the motor 27. Thus, a power circuit has one line L-1 connected through a slip ring connection 95 to the shaft 85 and the eccentric 90, while the other power wire L-2 is connected by a wire 96 to the common terminal of the motor 27. A double pole, double throw switch 98 has its two common terminals connected by wires 99L and 99R to the contacts 91L and 91R, while one set of stationary contacts of the switch 98 is connected by wires 100L and 100R to the other two terminals of the motor 27.

A pair of current comparing or measuring devices such as a pair of light bulbs 101L and 101R are provided for use in coordinating the control means with a particular saw blade, one terminal of each bulb being connected to the line wire L-2, while the other terminals of the bulbs 101L and 101R are connected respectively by wires 102L and 102R to the other set of stationary contacts of the switch 98.

When the control means 26 is to be coordinated with a particular saw blade and blade speed, the switch 98 is placed in its left hand setting, and the saw is operated in an idle or non-sawing relation at the desired speed, and when this is done the forces then acting on the blade, including those forces introduced by the natural twist in the blade, and its straightness or lack thereof, serve conjointly to establish a normal lateral position in which the blade runs as it passes through the sensing means 26. Ideally, this normal position would be such that the center of the toothed edge would be located at the point C, FIG. 5, which is the centerline or axis of the curved surface of the guide G, but in practice the normal position usually locates the tooth line at a short distance to one side of the point C.

Assuming for descriptive purposes that the normal position assumed by the saw is the aforesaid ideal position, the switch blades 91L and 91R are adjusted so that the two lamps 101L and 101R glow with the same intensity, this being an indication that the two brushes 191R and 191L are spaced equally from the axis of the shaft 85 and are contacting the eccentric 90 for equal distances or arcs in each rotation of the shaft 85 as indicated in FIG. 6. Preferably this adjustment provides for circuit closure to each brush for an arc of but 4 or 5 degrees in each rotation of the shaft 85, but this may be varied.

When the initial adjustment of the brushes 91L and 91R has been completed, the switch 98 is reversed so as to place the motor 27 under control of the control means 26. When this is done, the same equal and quite frequent pulses of current will flow alternately to the opposite windings of the motor 27, but since net power supplied to the opposite windings is the same, there will be no rotation of the motor 27.

During a sawing operation, however, the interaction of the work and the saw may tend to shift the saw laterally so that the sensing means 25 is swung to one side or the other about its pivot 89, and in FIG. 5 such swinging movements are indicated in an exaggerated manner. Thus, if the sensing means 25 swings clockwise toward the guide G to the plane AY, FIG. 5, the eccentric 90 will be shifted toward the brush 191R and away from the brush 191L. Similarly, a swinging movement of the sensing means in the opposite direction to the plane BY, from the guide G, moves the eccentric 90 toward the brush 191L and away from the brush 191R. The last-mentioned relationship is shown schematically in FIG. 7 where it will be evident that the brush 191R is no longer engaged by the eccentric 90, while the arc of engagement with the brush 191L has been increased to about 135°.

Under such a situation where the rapid current pulses through the brush 191L are quite long, the motor 27 will operate at a relatively high speed in such a direction as to rotate the table 21 to the left, or in a counterclockwise direction, and it will be evident that the speed of such operation will increase as the undesired displacement of the sensing means 25 increases, and will gradually decrease as the sensing means 26 returns toward the desired original relation.

The forces that act between the work and the saw blade to tend to displace the blade and the sensing means as above described may be due for example to an inherent lead in the blade or to the contour of the pattern P, and the same corrective sequence follows regardless of the cause. Thus, FIG. 9 constitutes a highly schematic illustration of the sequence of correction that takes place when the pattern P causes the workpiece W to be shifted gradually to the right. When this occurs the workpiece W, by pressure applied to the right on the forward or toothed edge of the saw blade 22, tends to pivot the sensing means 25 counterclockwise so as to increase the length of the current pulses to the brush 191L. This causes the motor 27 to rotate the table 21 to the left, or counterclockwise, at a rate that varies generally with the amount of displacement of the sensing means 25.

The fundamental purpose of such table rotation is of course to relieve those saw displacing forces that are responsible for the detected lateral displacement of the saw, and where these forces are due to the contour of the pattern P, as shown in FIG. 9, this results in a progressive change in the heading of the workpiece W into the saw. This change of adjustment of the work heading causes the desired kerf center line KC to be maintained tangent to the center plane of the saw 22 at the point where the sawing action is taking place.

The pivotal movement of the table 21 results in a rather complex shifting of the actuating frame 50 as well as the table 21. Thus, as the point P-1 on the pattern P passes the center point of the guide G, left hand or counterclockwise rotation of the table 21 starts gradually, and this, coupled with the continued advancing movement of the table 21, causes the rotative center of the table 21 to move from point A-1 to point A-2 as the effective point of the pattern P moves from P-1 to P-2. During this time the kerf K is extended along the desired center line KC to point K-2. Further progress is shown by corresponding suffixes applied to the letters A along the path of the table center line, the letters P along the pattern, and the points K along the desired kerf center line. It may be noted that a curve of the pattern P in the opposite direction would of course cause rotation of the table 21 in the other direction, and in such a case the path of the table axis would curve oppositely, or upwardly and to the right as viewed in FIG. 9.

The corrective action of the sensing means is the same as above described when the sensed deviation is caused by inherent lead of the blade or like circumstances, and the action of the control is such that extremely slight deviations of the blade from the normal free running position are effective to bring about prompt adjustment of the work heading, and this assures accuracy of cut and smoothness of the cut surfaces in both contour and straight sawing.

It is to be noted in particular that the control means 26 provides extreme sensitivity when the normal arc of contact of the brushes with the eccentric 90 is quite small, on the order of from 2° to 4°, for in this relation a very slight lateral displacement of the eccentric 90 causes a rapid increase in its arc of contact with the other brush. The net power to one winding of the motor is thus increased rapidly while at the same time the net power to the other motor winding is being rapidly decreased, so that the corrective action is quickly obtained upon detection of but slight changes in the lateral position of the saw.

From the foregoing description it will be apparent that the present invention provides a new and improved band saw structure which enables band saws to be used under automatic control, and in which either contour or straight sawing paths may be followed with improved accuracy and improved surface finish. It will also be evident that the new and improved band saw structure that is provided by the present invention materially extends the usefulness of band saw equipment.

It will also be apparent that the present invention, by allowing the particular saw band to assume a normal or free running position during its sawing operation, avoids undue stresses on and in the saw blade that would tend to cause the saw blade to deviate from the intended sawing path, and it will also be apparent that by using this free running saw blade and governing the relationship of the saw to the work by shifting the work heading, the present invention has enabled improved accuracy and surface finish to be attained. More particularly, it will be evident that the present invention enables the lateral forces acting between the saw and the work to serve as the basic control for maintaining the cut along the desired path, and it will also be apparent that the present invention enables this control to be attained in such a way that it is applicable with equal facility to either contour or straight line sawing. It will also be evident that under the present invention the control of the sawing path is attained with extreme accuracy to the end that smoothness of cut and accuracy of the line of cut are attained.

Thus, while a preferred embodiment of the invention has been illustrated herein, it is to be understood that changes and variations may be made by those skilled in the art without departing from the spirit and scope of the appended claims.

I claim:

1. In a band saw having a frame with upper and lower guide wheels mounted thereon and an endless saw blade operated thereby to draw the working run of the saw blade downwardly at one side of said wheels through a sawing zone, a work table having an open central area through which said working run of the saw blade may extend and opposite which area a pattern and a work piece may be clamped to the table, a stationary guide on and in fixed relation to the frame and adjacent said working run of the blade and against which guide the control edge of such a pattern may abut, means for supporting said table for rotative as well as coordinate movement in a horizontal plane, an actuating frame for said table having means for imparting yielding feed movement to the table in the general plane of the saw blade and for imparting lateral movement to the table generally at right angles to the plane of the saw for maintaining such a pattern in engagement with the guide, means including a reversible electric motor on said actuating frame for imparting rotation in either direction to said table, sensing means supported on said frame and engaging said working run of the saw blade as it moves toward the sawing zone and shiftable in response to lateral deviation of the sensed position of the blade, and circuit control means for said motor governed by shifting movement of said sensing means for operating the motor in one direction when the sensing means is shifted in one direction from a predetermined normal position and for operating the motor in the other direction when the sensing means is shifted in the other direction from said normal position.

2. In a band saw having a frame with upper and lower guide wheels mounted thereon and an endless saw blade operated thereby to draw the working run of the saw blade downwardly at one side of said wheels through a sawing zone, a work table having an open central area through which said working run of the saw blade may extend and opposite which area a pattern and a work piece may be clamped to the table, a stationary guide on and in fixed relation to the frame and comprising an arcuate convex surface facing laterally away from the saw blade and centered on the desired vertical center line of the toothed edge of the saw blade, said guide being adjacent said working run of the blade and being adapted to position the control edge of such a pattern held in abutment therewith, means for supporting said table for rotative as well as coordinate movement in a horizontal plane, an actuating frame for said table having means for imparting yielding feed movement to the table in the general plane of the saw blade and for imparting lateral movement to the table generally at right angles to the plane of the saw for maintaining such a pattern in engagement with the guide, means including a reversible electric motor on said actuating frame for imparting rotation in either direction to said table, sensing means supported on said frame and engaging said working run of the saw blade as it moves toward the sawing zone and shiftable in response to lateral deviation of the sensed position of the blade, and circuit control means for said motor governed by shifting movement of said sensing means for operating the motor in one direction when the sensing means is shifted in one direction from a predetermined normal position and for operating the motor in the other direction when means is shifted in the other direction from said normal position.

3. In a band saw having a frame with upper and lower guide wheels mounted thereon and an endless saw blade operated thereby to draw the working run of the saw blade downwardly at one side of said wheels through a sawing zone, a work table having an open central area through which said working run of the saw blade may extend and opposite which area a pattern and a work piece may be clamped to the table, a stationary guide on and in fixed relation to the frame and adjacent said working run of the blade and against which guide the control edge of such a pattern may abut, means for supporting said table for rotative as well as coordinate movement in a horizontal plane, an actuating frame for said table having means for imparting yielding feed movement to the table in the general plane of the saw blade and for imparting lateral movement to the table generally at right angles to the plane of the saw for maintaining such a pattern in engagement with the guide, means including a reversible electric motor on said actuating frame for imparting rotation in either direction to said table, sensing means supported on said frame and engaging said working run of the saw blade as it moves toward the sawing zone and shiftable in response to lateral deviation of the sensed position of the blade, and circuit control means for said motor governed by shifting movement of said sensing means for feeding rapid short current pulses alternately to opposite windings of the motor when sensing means is in a predetermined normal position and for shortening the pulses to one winding and lengthening the pulses to the other winding of the motor as the sensing means is shifted in one direction from said normal position, and for oppositely varying the pulse lengths when the sensing means is moved in the opposite direction.

4. A band saw according to claim 3 wherein said circuit control means includes a rapidly rotating eccentric acting as a common electrical element between a pair of resilient contacts for providing said pulses and in which said eccentric has means for rapidly rotating the same.

5. A band saw according to claim 3 wherein the rate of change of the length of said pulses is greatest when the sensing means is close to said normal position.

6. In a band saw having a driven blade member and a movable work table member upon which a workpiece may be fixed, sensing means for detecting lateral deviation of the blade member from a desired lateral position, adjusting means acting on one of said members and including a reversible electric motor having forward and reverse windings for readjusting the relative heading of the blade member and the table member, and control means governed by said sensing means for energizing both windings of said motor by rapid pulses of equal length when the blade member is in its desired lateral position and for inversely varying the length of the pulses to the respective windings in an opposite relation when the blade member deviates from said position in opposite directions.

7. In a band saw having a driven blade member and a movable work table member upon which a workpiece may be fixed, sensing means for detecting lateral deviation of the blade member from a desired lateral position, adjusting means acting on one of said members and including a reversible electric motor having forward and reverse windings for readjusting the relative heading of the blade member and the table member, and circuit control means for said motor governed by shifting movement of said sensing means for feeding rapid short current pulses alternately to opposite windings of the motor when sensing means is in a predetermined normal position and for shortening the pulses to one winding and lengthening the pulses to the other winding of the motor as the sensing means is shifted in one direction from said normal position, and for oppositely varying the pulse lengths when the sensing means is moved in the opposite direction.

8. In a band saw having a movable work table on which a workpiece may be fixed, and a driven band saw blade having a laterally free working run adapted to saw along a predetermined path through such a workpiece, feed means acting on the table for feeding the workpiece into sawing relation to the saw blade, means for establishing the desired predetermined path along which the workpiece is to be cut, sensing means governed by the saw blade for detecting lateral deviation of the saw blade from said desired predetermined path, and means governed by said sensing means and acting on said table for correcting the sensed deviation.

9. In a band saw having a movable work table on which a workpiece may be fixed, and a driven band saw blade having a laterally free working run adapted to saw along a predetermined path through such a workpiece, back-up means for said working run of the saw blade for absorbing the working thrust, feed means acting on the table for feeding the workpiece into sawing relation to the saw blade, means for establishing the desired predetermined path along which the workpiece is to be cut, said laterally free working run of said saw being responsive to and being shifted laterally by unbalanced lateral forces between the work and the blade, sensing means governed by the saw blade for detecting lateral deviation of the saw blade from said desired predetermined path, and means governed by said sensing means and acting on said table for shifting said table to restore the balance of such lateral forces.

10. In a band saw having a work table mounted for both coordinate and rotative movement and on which a workpiece and a pattern may be fixed, and a driven band saw blade having a laterally free working run adapted to saw along a predetermined path through such a workpiece, feed means acting on the table for feeding the workpiece into sawing relation to the saw blade, means including the pattern for establishing the desired predetermined path along which the workpiece is to be cut, sensing means governed by the saw blade for detecting lateral deviation of the saw blade from said desired predetermined path, and means governed by said sensing means and to rotatively adjust said table for correcting the sensed deviation.

11. In a sensing and control means for a band saw, a bracket adapted to be mounted in fixed position behind the working run of a saw band, a sensing head mounted on the forward side of the bracket on a vertical pivotal axis and having saw engaging elements thereon for embracing the saw blade and rendering the sensing head pivotally responsive to lateral displacement of the toothed edge of such a saw blade, a back-up roller mounted on said sensing head in position to be engaged and rapidly rotated by a saw blade, a shaft connected to and rotated by said back-up roller and mounted on said sensing head and extending perpendicularly with respect to the pivotal axis of the sensing means, an eccentric carried by said shaft remote from said pivotal axis, and switch means carried by said bracket on opposite sides of said eccentric for actuation and control thereby and disposed for cooperation with the eccentric in a plane perpendicular to the pivotal axis of the sensing means.

12. A sensing and control means according to claim 11 wherein individual adjusting means are provided for the switch means for establishing like cooperation of the switch means with the eccentric in different selected normal positions in which the eccentric may be required to operate.

13. In a sensing and control means for a band saw, a bracket adapted to be mounted in fixed position behind the working run of a saw band, a sensing head mounted on the forward side of the bracket on a vertical pivotal axis and having saw engaging elements thereon for embracing the saw blade and rendering the sensing head pivotally responsive to lateral displacement of the toothed edge of such a saw blade, a shaft mounted on said sensing head and extending perpendicularly with respect to the pivotal axis of the sensing means, an eccentric carried by said shaft remote from said pivotal axis, means for imparting rapid rotation to said shaft at a substantially constant speed, and switch means carried by said bracket on opposite sides of said eccentric for actuation and control thereby and disposed for cooperation with the eccentric in a plane perpendicular to the pivotal axis of the sensing means.

14. The method of band sawing which includes the steps of operating, in idle relation and sawing speed, a new saw blade that is substantially unrestrained laterally in region where it approaches the sawing zone to enable the saw to assume a normal lateral position as it approaches the sawing zone, continuously sensing the blade as it moves toward the sawing zone to detect lateral deviation of the blade from such normal position as a sawing operation progresses, and adjusting the heading direction of the work in response to the sensed deviation of the blade to relieve the forces that have produced the sensed deviation.

15. The method of band sawing which includes the steps of operating in idle relation and sawing speed, a saw blade that is substantially unrestrained laterally in region where it approaches the sawing zone to enable the saw to assume a normal lateral position as it approaches the sawing zone, continuously sensing the blade as it moves toward the sawing zone to detect lateral deviation of the blade from such normal position as a sawing operation progresses, and under control of the sensing means, producing two separate series of modulated current pulses wherein the pulses in the two series are equal when there is no detected deviation and wherein the pulses of the two series are respectively increased and decreased in an opposite relation in response to detected deviation in opposite directions, and utilizing said two series of current pulses to adjust the heading direction of the work in response to the sensed deviation of the blade to relieve the forces that have produced the sensed deviation.

16. The method of band sawing that includes the steps of establishing a desired sawing path with respect to a workpiece, advancing the workpiece into sawing relation to the working run of a band saw so that the lateral forces thereafter acting between influence the lateral position of the saw blade relative to the desired sawing path, sensing any deviation of the blade from such desired path, and adjusting the heading of the work in response to the sensed deviation to re-balance the lateral forces acting between the workpiece and the blade and continue the sawing along the desired path through the workpiece.

No references cited.

DONALD R. SCHRAN, *Primary Examiner.*